May 3, 1955
F. G. BACK
2,707,423
MIRROR OBJECTIVE CAMERA HAVING RETICLE
PROJECTION MEANS AND REFLEX FINDER
Filed March 20, 1952
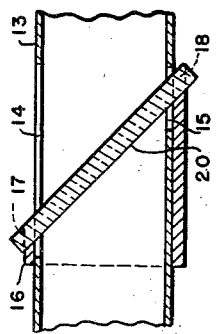
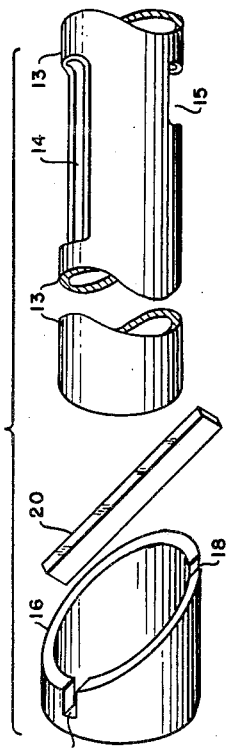
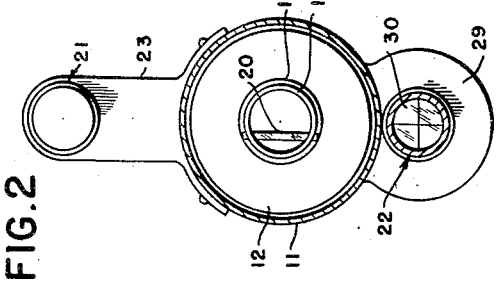
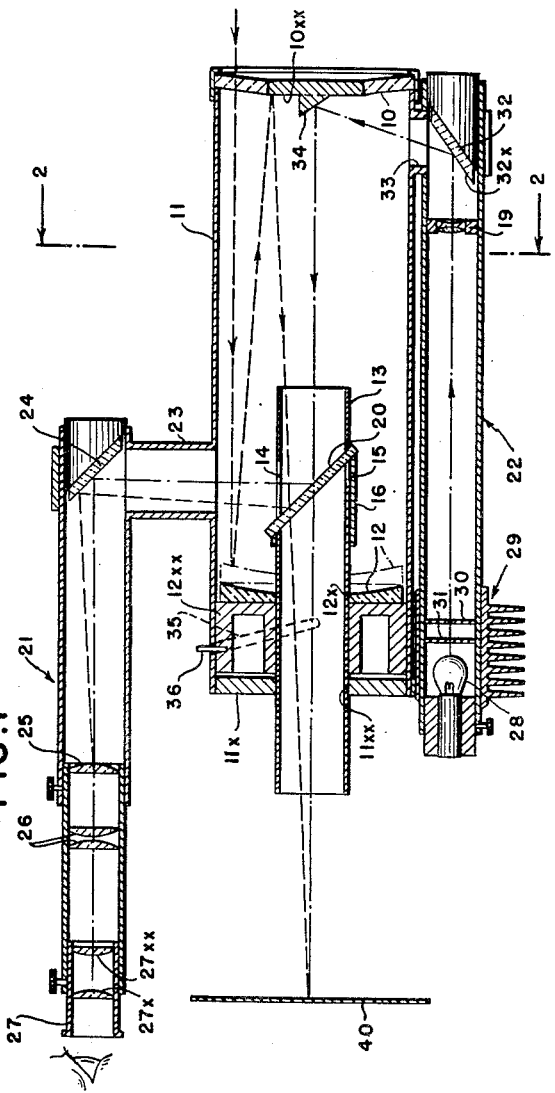
INVENTOR.
Frank G. Back

United States Patent Office 2,707,423
Patented May 3, 1955

2,707,423

MIRROR OBJECTIVE CAMERA HAVING RETICLE PROJECTION MEANS AND REFLEX FINDER

Frank G. Back, New York, N. Y.

Application March 20, 1952, Serial No. 277,669

2 Claims. (Cl. 95—42)

This invention relates to new and useful improvements in reflex view finders for motion picture and other types of cameras and the like.

The conventional reflex view finders are based on single lens and twin lens systems.

The single lens reflex view finder system employs the same objective lens for both the observation of the object image and the taking of the picture. Thus, the reflex viewing means have to be withdrawn when a picture is taken which makes it impossible to observe the object during the exposure.

The twin lens system provides a separate objective lens for the view finder. While this arrangement permits continuous observation of the object, particularly during exposure, there exists the substantial disadvantage of a parallax difference between the object images, as observed in the view finder on the one hand, and as photographed by the camera on the other hand.

It is an object of the present invention to combine the advantages inherent in the single lens reflex view finder system and the twin reflex view finder system while at the same time eliminating the disadvantages common to each of the systems.

It is accordingly a further object of the present invention to provide a parallax-free reflex view finder for cameras and the like which is adapted to permit continuous observation of the object, particularly during exposure and which will present to the observer a picture identical to the picture photographed by the camera.

It is a further object of the present invention to provide a parallax-free view finder system permitting observation of the object during exposure wherein said view finder is combined with an arrangement which permits the superimposition of a reticle upon the image as seen in the view finder and also the image as produced on the film.

In employing a glass plate of semi-transparent glass as a beam splitter as taught in my co-pending application issued as U. S. Pat. No. 2,595,750 on May 6, 1952, certain disadvantages are encountered, namely, certain chromatic aberrations are caused.

When substituting a cube beam splitter for the plano-parallel glass-plate beam splitter, the difficulty resides in the fact that sufficiently large pieces of optical glass which are free of striae cannot easily be obtained by the present conventional means of optical glass production and, furthermore, a cube beam splitter will at all times show spherical aberration and astigmatism.

It is accordingly a further object of the present invention to eliminate defects such as chromatic aberrations, striae and spherical aberrations which are inherent in devices in which beam splitters are employed as component parts thereof.

These and other objects and advantages of the present invention will be evident and apparent on hand of the detailed description of the preferred form of the invention as represented in the drawings in which:

Fig. 1, the side elevational view in cross section;

Fig. 2 is a sectional view along the line 2—2 of Fig. 1;

Fig. 3 is a cross-sectional view of the assembled mirror elements of the device.

Fig. 4 is an exploded perspective view of the elements shown in Fig. 3.

Referring now to the specific form of the invention as shown in the drawings, it will be seen that the arrangement comprises a mirror objective consisting of correction plate 10, spherical concave mirror 12 and the rearward mirrored center portion $10xx$ of correction plate 10, or other objective means located within the tube 11. The correction plate 10 is preferably constructed of suitable optical glass adapted to permit the ingress of light rays from an object located in front thereof. The rearward side of the circular center portion of said correction plate 10, $10x$ is suitably coated with reflective material $10xx$ such as mirroring or the like. In front of the rear end portion $11x$ of tube 11; within the tube 11 concave mirror 12 is located which is adapted to reflect light rays passing through correction plate 10 upon the reflecting mirrored center surface $10xx$ thereof. An aperture $11xx$ is suitably provided within the rear end portion $11x$ of tube 11. An aperture $12x$ is provided in the mirror 12 which is of substantially the same diameter as the aperture $11xx$ in the rear end portion $11x$ of the tube 11.

A tube 13 is fixedly mounted through the rear end portion of tube 11, traversing the apertures $11xx$ and $12x$. The tube 13 is concentric with tube 11 and the mirror 12 is slideably mounted on tube 13 circumscribing its outer periphery. The mirror 12 can be moved in accordance with the requirements of the object position and the dotted position of the mirror indicates the mirror 13 in its position when the object is at infinity. Within the sheathing of the tube 13 the slots 14 and 15 are cut so as to be substantially juxtaposed to each other. In the preferred arrangement the slot 14 will be somewhat greater in length than the slot 15, and they are located behind the front orifice of the tube 13.

The tube section 16 is slideably mounted on tube 13 so as to circumscribe it. The tube section 16 is cut at an angular bias on one side thereof, having horizontal indentations 17 and 18 cut into the periphery of the tube 16 in such manner that the indentation 17 forms a slit in line with the corresponding slit formed by indentation 18. The preferred arrangement for the slots 17 and 18 is that they be located off center so as to accommodate the mirror 20 in the most advantageous position. The indentations 17 and 18 are adapted to receive therein fixedly mounted the mirror 20. The tube 16 is mounted upon the tube 13 in such manner that the indentations 17 and 18 correspond with the slots 14 and 15 respectively so that when the mirror 20 is fastened into the indentations 17 and 18 of tube 16, the mirror 20 will transverse the tube 13 in such a manner as to be substantially inclined at an angle of approximately 45° relative to the axis of the mirror objective consisting of correction plate 10, spherical concave mirror 12 and the rearward mirrored center portion $10xx$ of correction plate 10. Behind the mirror 20 in the image plane of the mirror objective and attached in a suitably conventional manner, to tube 13, a camera is disposed. The arrangement is such that the film 40 of the camera will be in the image plane of the objective.

As illustrated in Fig. 2 the mirror 20 is only a small, narrow strip so that when it is disposed within the tube 13 most of the light entering through the correction plate 10 which will pass along a path hereinafter described into the orifice of tube 13 and will bypass said mirror 20 at either lateral side thereof. Above the tube 11 and connected thereto the view finder arrangement 21 is located. Below the tube 11 and connected thereto the reticle printer 22 is located. Both the view finder 21 and the reticle printer 22 are connected to the tube 11 in such manner as to permit the transmission of light rays respectively through tube 11 along the hereinafter described paths.

Having first reference to the view finder 21 it will be noted that it is connected by means of integral tube 23 to the tube 11. The tube 23 is positioned in such manner that light rays which are projected upon mirror 20 will be reflected at an angle relative to their incidence by mirror 20 and thus pass through tube 23 into the view finder 21. Mirror 24 is positioned within the tube 21 at the exit of tube 23 in such manner that it is directly above the mirror 20 and rays reflected from mirror 20 will impinge thereon. The mirrors 24 and 20 are arranged parallel with each other on the vertical plane. A diffuser field lens 25 is arranged so as to face said mirror 24. In front of the diffuser field lens 25 the erector lens system 26 is located and the eye piece 27 consisting of field lens 27xx and eye lens 27x is located. The image reflected from mirror 20 into mirror 24 is reproduced as a real inverted image at the lens 25 which is located at the plane of the real inverted image.

Having now reference to the reticle printer 22 it will be seen that the light source 28 is located in the tube 29 which is connected to the tube 11. In front of the light source 28 the reticle 30 is arranged, the diffuser 31 being disposed between the reticle 30 and the light source 28. In front portion of tube 29 mirror 32 having its mirrored surface 32x inclined upward at an acute angle and being directed toward the light source 28 at an obtuse angle is fixedly positioned. The objective lens 19 is positioned in front of mirror 32 and serves to project a real, magnified image of the reticle 30 onto the film plane 40. The vertical tube 33 fixedly interconnects the reticle printer 22 with the tube 11.

Illustrating now the operative function of the device as herein set forth it will be noted that a light ray from the object will enter through correction plate 10 and impinge upon mirror 12 from whence it is reflected back upon the mirrored center surface portion 10xx of correction plate 10 from where it is reflected reversely through the orifice of tube 13 onto the mirror 20 from whence it is reflected through the opening 14 in the upper portion of tube 13 and thence through the vertical tube 23 onto the mirror 24 into the diffuser field lens 25 forming a real inverted image therein, which can be observed by means of the optical system consisting of erector lens 26, field lens 27xx and eye lens 27x. In this arrangement it is obvious that the mirrors 24 and 20 are parallel so as to obtain the desired result.

The image of the reticle 30 will be projected upon the mirror 32 and from there through the vertical tube 33 into tube 11. In the center of the mirrored rear center portion 10xx of correction plate 10, the mirror 34 is arranged and the light ray from the mirror 32 will be impinged thereon being from there reflected upon the mirror 20 from whence it will be reflected upon the mirror 24 into the view finder arrangement 21.

The paths of light rays from the object and from the reticle into the eye piece of the view finder have now been detailed. Following now the paths of light rays from the object and the reticle onto the film plane, it will be seen that light rays from the object passing through correction plate 10 to the mirror 12 and from there to the mirrored surface 10xx will be reflected into the orifice of the tube 13 and bypass the mirror 20 on either side thereof (it being considered here that the mirror 20 is a narrow strip), and impinge upon the film 40.

The light rays from the reticle will be reflected by the mirror 32 onto the mirror 34 and from there they will pass into the orifice of tube 13 bypassing mirror 20 then impinging upon the film 40.

It will be noted that the mirror 12 is slideably mounted on tube 13 circumscribing its outer periphery. A slit 35 is suitably provided in angular relation within the body portion of tube 11 and a pin 36 is fixedly attached to the mounting of mirror 12 so that when the pin 36 is moved within the slit 35 the mirror 12 is laterally moved forward or rearward along the length of tube 13 in the optical axis of the mirror objective, in this manner to maintain a stationary focal point for the object regardless of object, location, distance and position.

The diffuser 25, erector 26 and eye piece 27 are suitably arranged in such manner within the view finder arrangement 21 that they can also be moved to adjust for maximum sharpness of the image to be viewed. It will be noted that the mirror 12 as it is movable along the optical axis of the mirror objective will permit accurate focusing of the image of the object both with respect to the film plane and with respect to diffuser field lens 25, therefore it functions as a focusing arrangement and eliminates any and all parallax between the image formed in view finder 21 and the image formed at film plane 40.

While one specific embodiment of the preferred form of the invention has been shown and described wherein a parallax-free view finder for continuous observation of the object in combination with reticle printer adapted to reproduce the reticle on the film and concurrently in the eye piece of the view finder has been shown, it is nevertheless understood that various modifications of the present invention may be apparent to those skilled in the art.

The device as herein set forth, by its specific embodiments, is adapted to overcome certain disadvantages such as chromatic aberrations, striae and spherical aberrations heretofore inherent in conventional constructions and in such constructions as set forth in my copending application issued as U. S. Pat. No. 2,595,750 on May 6, 1952.

Variations and modifications of the present invention may be made, as obvious, without departing thereby from the spirit and scope of this invention and therefore the same is only to be limited by the scope of the prior art and the scope of the appended claims.

Having set forth and described the preferred form of my invention, what I desire to claim and secure by Letters Patent is:

1. In a mirror objective consisting of a correction plate, an apertured spherical primary mirror, adapted to deflect the light rays passing through the correction plate toward a secondary mirror located at the rear surface of said correction plate, said secondary mirror adapted to deflect the light rays coming from the primary mirror to a sensitive surface located behind the apertured primary mirror, said correction plate primary mirror and secondary mirror coaxially aligned with each other, the arrangement of an inclined mirror in the center rear portion of said secondary mirror and a reticle projection arrangement at a location laterally of the mirror objective, wherein said inclined mirror is adapted to deflect the rays emanating from the projection arrangement towards the sensitive surface behind the apertured primary mirror and to superimpose a secondary image of the reticle upon the principal image produced by the correction plate, the primary mirror and the secondary mirror at the sensitive surface, and where said inclined mirror permits the utilization of heretofore unused areas of said secondary mirror.

2. In a mirror objective consisting of a correction plate, an apertured spherical primary mirror, adapted to deflect the light rays passing through the correction plate toward a secondary mirror located at the rear surface of said correction plate, said secondary mirror adapted to deflect the light rays coming from the primary mirror to a sensitive surface located behind the apertured primary mirror, said correction plate, primary mirror and secondary mirror coaxially aligned with each other, the arrangement of an inclined mirror in the center rear portion of said secondary mirror and a reticle projection arrangement at a location laterally of the mirror objective, wherein said inclined mirror is adapted to deflect the rays emanating from the projection arrangement towards the sensitive surface behind the apertured primary mirror and to superimpose a secondary image of the reticle upon the principal image produced by the correction plate, the primary mirror and the secondary mirror at the sensitive surface, and where said inclined mirror permits the utilization of heretofore unused areas of said secondary mirror, in conjunction with a strip mirror located near the common axis of said correction plate, primary and secondary mirror, between said secondary mirror and the aperture of the primary mirror, adapted to be bypassed by the major portion of the light rays coming from said secondary mirror and said inclined mirror and going to the sensitive surface, and further adapted to deflect the smaller portion of said light rays into viewing and focusing means arranged laterally of said mirror objective.

References Cited in the file of this patent

UNITED STATES PATENTS

| | | |
|---|---|---|
| 518,678 | Paoli | Apr. 24, 1894 |
| 1,298,582 | Shafer et al. | Mar. 25, 1919 |
| 2,504,383 | Bouwers et al. | Apr. 18, 1950 |
| 2,504,384 | Bouwers | Apr. 18, 1950 |